Patented Oct. 30, 1945

2,388,082

UNITED STATES PATENT OFFICE 2,388,082

PAINT REMOVER

Joseph C. Roediger, Brooklyn, N. Y., assignor to Standard Oil Development Company, a corporation of Delaware No Drawing. Application November 22, 1941, Serial No. 420,087

2 Claims. (Cl. 252—154)

This invention relates to improved compositions used for the removal of finish coatings produced with paint, varnish, lacquer or the like.

Numerous paint removers are now on the market, those most extensively used consist of a mixture of a low molecular weight alcohol, an aromatic hydrocarbon, such as benzene, and an aldehyde or a ketone, such as acetone. Other paint removers consist of mixtures of an aromatic hydrocarbon, an alcohol and a water-soluble amine, or an aromatic hydrocarbon, a ketone and a water-soluble amine. These compositions may also contain some wax which may or may not be entirely in solution. The paint remover is generally applied by means of a brush and allowed to penetrate into the dry paint or varnish film until sufficient softening occurs to permit removal of the film by means of a scraper or knife. The objection to these paint removers is that the predominant paint loosening constituents, that is, the aromatics, phenols or ketones, are volatile, toxic compounds which must be used in well-ventilated areas in order to avoid poisoning of the operator.

An object of this invention is to provide a paint remover that is not toxic.

Another object of this invention is to provide a more efficient paint remover by the use of an oil-soluble component which will penetrate the paint, varnish or lacquer film more readily than the aromatics, phenols or water-soluble amines previously used heretofore.

According to this invention, it has been found that a satisfactory mixture results by proper combination of an aliphatic alcohol, a hydrocarbon solvent, a small percentage such as 3 to 10% of an oil-soluble primary, secondary or tertiary amine containing at least 8 carbon atoms to the molecule and a small amount of paraffin or vegetable wax. The aliphatic alcohols of 3 to 5 carbon atoms used are isopropyl, ethyl, etc. The hydrocarbon solvent may be a straight run petroleum product of very low aromaticity which is not toxic, has a gravity of 55–65° A. P. I. and a boiling range of 180–500° F. or higher. The naphtha and alcohol function mainly as diluents to aid in the uniform distribution of the oil-soluble amine over the surface from which the paint is to be removed.

The paint removing properties of these compositions are principally dependent upon the action of the amine whose oil-solubility and low interfacial tension with respect to the paint enhance penetration into and wetting of the paint film to permit rapid softening. Wax may be added in which case the naphtha and the alcohol are so proportioned that the slight evaporation occurring shortly after application of the paint remover results in the precipitation of wax at the air-paint remover interface. This film of wax reduces subsequent evaporation of the remover and thus permits the amine to be more deeply absorbed by the paint.

The following compositions were found to effectively remove paint coatings:

Composition I

| | Per cent |
|---|---|
| Secondary butyl alcohol | 45 |
| Varsol, a petroleum hydrocarbon having a boiling range of 310–410° F. and a flash of 100° F | 40 |
| Lauryl-methyl amine | 7 |
| Paraffin wax | 6 |
| Japan wax | 2 |

Composition II

| | Per cent |
|---|---|
| Ethyl alcohol | 45 |
| V. M. & P. naphtha, petroleum hydrocarbon having a boiling range of 210–315° F. and a flash of 30° F. closed | 43 |
| Heptadecyl amine | 9 |
| Paraffin wax | 3 |

Composition III

| | Per cent |
|---|---|
| Secondary butyl alcohol | 45 |
| Deodorized kerosene | 35 |
| Lauryl amine | 6 |
| Paraffin wax | 4 |
| Methyl ethyl ketone | 10 |

Composition IV

| | Per cent |
|---|---|
| Isopropyl alcohol | 53 |
| Petroleum naphtha | 35 |
| Paraffin wax | 6 |
| Lauryl amine | 6 |

The amines that may be used according to this invention are lauryl amine, diphenyl amine, decyl diamine, lauryl-methyl amine, lauryl-dimethyl amine, heptadecyl amine, etc.

I claim:

1. A finish remover for painted, varnished, and lacquered finishes comprising 53% by weight isopropyl alcohol, 35% by weight petroleum naphtha, 6% by weight paraffin wax and 6% by weight lauryl amine.

2. In a process of removing finish compositions from painted, varnished, and lacquered surfaces, the step of disintegrating the coating by covering the finish coating with a solvent composition, comprising 45 to 53% by weight of an alcohol having 2 to 5 carbon atoms to the molecule, 35 to 43% by weight of a petroleum naphtha having a boiling range of 180° to 500° F., 3 to 6% by weight of paraffin wax and 3 to 10% by weight of an oil-soluble amine having at least 8 carbon atoms to the molecule, selected from the group consisting of lauryl amine, diphenyl amine, decyl amine, laurylmethyl amine, lauryl dimethyl amine, and heptadecyl amine.

JOSEPH C. ROEDIGER.